United States Patent
Leenders et al.

(10) Patent No.: US 11,186,717 B2
(45) Date of Patent: Nov. 30, 2021

(54) ENHANCED POWDER FLOW AND MELT FLOW OF POLYMERS FOR ADDITIVE MANUFACTURING APPLICATIONS

(71) Applicant: SABIC Global Technologies B.V., Bergen op Zoom (NL)

(72) Inventors: Chiel Albertus Leenders, Fijnaart (NL); Samuel Ijsselmuiden, Delft (NL); Johannes Gerardus Petrus Goossens, Heeswijk-Dinther (NL); Bruke Jofore, Bergen op Zoom (NL); Hao Gu, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 503 days.

(21) Appl. No.: 16/062,156

(22) PCT Filed: Dec. 20, 2016

(86) PCT No.: PCT/IB2016/057835
§ 371 (c)(1),
(2) Date: Jun. 14, 2018

(87) PCT Pub. No.: WO2017/109703
PCT Pub. Date: Jun. 29, 2017

(65) Prior Publication Data
US 2018/0371244 A1 Dec. 27, 2018

Related U.S. Application Data (60) Provisional application No. 62/270,302, filed on Dec. 21, 2015.

(51) Int. Cl.
*B29C 64/153* (2017.01)
*C08L 79/08* (2006.01)
(Continued)

(52) U.S. Cl.
CPC ............ *C08L 79/08* (2013.01); *B29C 64/153* (2017.08); *C08L 79/00* (2013.01); *C09D 183/04* (2013.01);
(Continued)

(58) Field of Classification Search
CPC ....... B29C 64/153; B33Y 10/00; B33Y 70/00; B29K 2279/085
(Continued)

(56) References Cited

U.S. PATENT DOCUMENTS

| 5,990,268 A | 11/1999 | Dickens, Jr. et al. |
| 6,136,948 A | 10/2000 | Dickens, Jr. et al. |

(Continued)

FOREIGN PATENT DOCUMENTS

| CN | 1498920 A | 5/2004 |
| JP | 2009149839 A | 6/2007 |

(Continued)

OTHER PUBLICATIONS

English abstractor JP2009149839A (Year: 2009).*
(Continued)

*Primary Examiner* — Jeffrey M Wollschlager
*Assistant Examiner* — Xue H Liu
(74) *Attorney, Agent, or Firm* — Cantor Colburn LLP (57) ABSTRACT

Provided are thermoplastic-nanoparticle compositions that exhibit enhanced powder and melt flow. The disclosed compositions, comprising nanoparticles being silylated, have particular application in additive manufacturing processes, such as selective laser sintering and other processes.

13 Claims, 8 Drawing Sheets

(51) Int. Cl.
*C08L 79/00* (2006.01)
*C09D 183/04* (2006.01)
*B33Y 70/00* (2020.01)
*B33Y 10/00* (2015.01)
*B29K 279/00* (2006.01)
*C08K 3/34* (2006.01)
*C08K 5/5419* (2006.01)

(52) U.S. Cl.
CPC ......... *B29K 2279/085* (2013.01); *B33Y 10/00* (2014.12); *B33Y 70/00* (2014.12); *C08K 3/34* (2013.01); *C08K 5/5419* (2013.01)

(58) Field of Classification Search
USPC ........................................................ 264/497
See application file for complete search history.

(56) References Cited

U.S. PATENT DOCUMENTS

| | | |
|---|---|---|
| 8,247,492 B2 | 8/2012 | Martinoni |
| 8,795,833 B2 | 8/2014 | Dallner et al. |
| 2003/0100631 A1 | 5/2003 | Barthel et al. |
| 2003/0181626 A1 | 9/2003 | Lindway |
| 2004/0204531 A1 | 10/2004 | Baumann et al. |
| 2005/0027050 A1 | 2/2005 | Monsheimer et al. |
| 2007/0132158 A1 | 6/2007 | Martinoni et al. |
| 2013/0052453 A1 | 2/2013 | Filou et al. |
| 2014/0228462 A1 | 8/2014 | Narayanan et al. |
| 2016/0333190 A1* | 11/2016 | Brule .................... B29C 64/153 |

FOREIGN PATENT DOCUMENTS

| | | |
|---|---|---|
| JP | 5332323 B2 | 8/2013 |
| WO | WO 2008/036071 A2 | 3/2008 |
| WO | WO 2015/092272 A1 | 6/2015 |

OTHER PUBLICATIONS

International Patent Application No. PCT/IB2016/057835; Int'l Search Report and the Written Opinion; dated Mar. 24, 2017; 14 pages.

International Patent Application No. PCT/IB2016/057835; Int'l Preliminary Report on Patentability; dated Jul. 5, 2018; 9 pages.

* cited by examiner

Dimethylsilyl    Trimethylsilyl    Octylsilyl    Polydimethylsiloxane

ENHANCED POWDER FLOW AND MELT FLOW OF POLYMERS FOR ADDITIVE MANUFACTURING APPLICATIONS

CROSS-REFERENCE TO RELATED APPLICATION

This application is the National Stage of International Application No. PCT/IB2016/057835, filed Dec. 20, 2016, which claims the benefit of U.S. Provisional Patent Application No. 62/270,302 filed Dec. 21, 2015, the disclosures of which are incorporated herein by this reference in their entireties.

TECHNICAL FIELD

The present application relates to the field of additive manufacturing and to the field of polymeric powder compositions.

BACKGROUND

Thermoplastic powders for selective laser sintering (SLS) suitably exhibit favorable powder flow properties during the sintering process. The powders also suitably exhibit favorable melt flow characteristics as well. Favorable powder flow results in a smooth and well-packed powder bed with uniform layer thickness, which results in a better part processing, and favorable melt flow results in uniform finished parts.

Polymeric powders in general exhibit poor powder flow due to the surface forces that are dominant in small particles, irrespective of the particles' shape. Accordingly, it has not been possible to date to create smooth and well-packed powder bed surfaces that are required in the SLS process.

In laser sintering processes (e.g., those used in additive manufacturing), favorable particle fusion (favorable melt flow) is useful to obtain smooth and high density parts with favorable mechanical properties. Existing methods, however, such as reducing the molecular weight of the polymer and/or adding plasticizers have a strong negative influence on the mechanical and heat properties. Finding other method(s) that enhance the melt flow without compromising the mechanical/physical or chemical properties would enable manufacture of parts that have a higher density, require lower laser energy to give favorable melt, and ultimately result in better properties.

Accordingly, there is a need in the art for improved compositions for use in additive manufacturing processes. The value of such compositions would be enhanced if the compositions featured melt and/or powder flow characteristics that are improved relative to existing compositions used in additive manufacturing.

SUMMARY

Disclosed here is the use of flow promoters, e.g., nanoparticles (or their aggregates) with thermoplastic powders to enhance the flow characteristics of the powders for subsequent use in additive manufacturing processes. The flow promoters (nanoparticles), when dispersed, cover the surface of the micrometer-sized polymer particles and disrupt the Van der Waals attraction forces which otherwise results in powder agglomeration.

It was found that although some flow promoters result in an improved powder flow of the particles, the melt performance of an exemplary polyetherimide (PEI) is highly affected based on the amount and type of flow promoter used. It was determined what certain flow promoters within a certain concentration range yielded favorable powder and melt flow results, making the resultant compositions well-suited for SLS processes.

As one example, nanoparticles that result in favorable powder flow and melt flow may, e.g., have an average size of ≤35 nm (though the size is not necessarily bound to any particular minimum), and have a coating (e.g., silane) as well.

Without being bound to any particular theory, the lower the silane level of the coating the better the melt flow. With no coating, there was favorable melt flow seen at coated nanoparticle levels of ≤0.2 wt %. Octylsilyl coating exhibited favorable melt at levels ≤0.2%. Trimethylsilyl exhibited useful melt flow at levels ≤0.1%.

The present disclosure first provides, an additive-manufactured workpiece, comprising: an amount of a fused thermoplastic powder; a population of nanoparticles present at less than about 1 wt % measured against the weight of the thermoplastic and the nanoparticles in the workpiece, the population of nanoparticles having a volume average cross-sectional dimension of less than about 100 nm, and at least some of the nanoparticles being silylated.

The present disclosure also provides compositions, the compositions comprising a population of thermoplastic particles; and a population of silylated nanoparticles having a volume average diameter of less than about 100 nm, the population of silylated nanoparticles being present at less than about 0.2 wt % measured against the weight of the thermoplastic and the nanoparticles in the composition.

Also provided are methods, comprising depositing a first amount of a composition onto a target surface; the composition comprising a population of thermoplastic particles and a population of silylated nanoparticles having a volume average diameter of less than about 100 nm; and directing energy to the first amount of the composition so as melt a portion of the first amount of the composition and join the first amount of the composition to the target surface.

In addition, the present disclosure also provides systems, the systems suitably comprising a source of directed energy; a supporting surface; a dispenser configured to dispense an amount of a composition according to any of the aspects disclosed herein (e.g., aspects 13-28 disclosed here) onto the supporting surface; and a control system configured to effect controlled sintering by the source of directed energy of successively applied amounts of powder so as to form a pre-defined structure.

BRIEF DESCRIPTION OF THE DRAWINGS

The summary, as well as the following detailed description, is further understood when read in conjunction with the appended drawings. For the purpose of illustrating the technology, there are shown in the drawings exemplary and preferred embodiments of the invention; however, the disclosure is not limited to the specific methods, compositions, and devices disclosed. In addition, the drawings are not necessarily drawn to scale. In the drawings.

DETAILED DESCRIPTION OF ILLUSTRATIVE EMBODIMENTS

The present disclosure may be understood more readily by reference to the following detailed description taken in connection with the accompanying FIGs. and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the disclosed subject matter.

Also, as used in the specification including the appended claims, the singular forms "a," "an," and "the" include the plural, and reference to a particular numerical value includes at least that particular value, unless the context clearly dictates otherwise. Any documents mentioned herein are incorporated herein in their entireties for any and all purposes.

The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. When referring to a value, the term "about" means the value and all other values within 10% of the value. For example, "about 10" means from 9 to 11 and all intermediate values, including 10.

Thermoplastic powders (e.g. PEI, PC, PLLA, PBT, and PET) for selective laser sintering (SLS) suitably have favorable melt flow characteristics. Enhanced melt flow has several benefits in the SLS process, including lower laser energy input needed, better fusion of powder particles, smoother surfaces, and higher densities of final products.

An existing method for improving polymer powder melt flow is to use lower molecular weight polymers. Doing so, however, reduces the mechanical properties like impact resistance, tensile stress at break, creep, and the like. Another method to enhance melt flow is to add plasticizers. Plasticizers, however, reduce heat resistance and may also impact the mechanical properties of the finished product.

The effect of nanoparticles on the melt flow behavior in selective laser sintering has not, to date, been investigated or understood. The expectation is that the melt viscosity increases upon the addition of solid nanoparticles as Einstein previously derived.

Here is disclosed that the addition of selected classes of nanoparticles (also referred to as flow promoters) results in an improved melt flow behavior in SLS process, is evidenced by a decrease of the zero shear viscosity in comparison to the neat polymer resin and a decrease in the time evolution of the viscosity at a given temperature.

The effect of the nanoparticles on the zero shear viscosity may be—without being bound to any theory of operation—dependent on the specific interaction between the polymer matrix and the nanoparticles. Some polymers show a decrease in viscosity up on addition of few concentrations of nanoparticles, while others show a viscosity scaling lower than predicted by Einstein's viscosity law. Without being bound to any particular theory of operations, one or more of the following factors may influence melt flow behavior:

The melt viscosity drop is a function of the type of flow promoter and its concentration.

The type of coating on the surface of the nanoparticle may affect the type of grafting (physical and/or chemical) with the polymer powder and determines the corresponding viscosity drop. Amorphous polymers may exhibit viscosity scaling lower than that predicted by the Einstein's viscosity law is observed.

Polymer resins in fine powder form are usually aggregated because of the attractive Van der Waals forces and/or electrostatic forces. Due to that phenomena, thermoplastic powders with particle sizes suitable for laser sintering, typically having an average particle size of less than about 150 micrometers, may be agglomerated and form clumps of powder cakes that exhibit poor powder flow.

In the SLS process, a favorable powder flow is useful in achieving smooth and well packed successive powder layers with a uniform thickness. Optimally (but not necessarily), a powder has a favorable powder flow and a favorable melt flow during sintering, which characteristics ensure optimal fusion of the powder particles as well as favorable pre-fusion processing.

As one example, at present there are no commercial PEI powders suitable for laser sintering or any other processes that also require substantial powder flow. Accordingly, this problem has not thus far been addressed in the art. The following aspects are illustrative only and do not limit the scope of the present disclosure.

Aspect 1. An additive-manufactured workpiece, comprising: an amount of a thermoplastic powder (e.g., polyetherimide); at least some of the powder is in fused form, e.g., some of the powder particles are fused to one another. The workpiece also suitably comprises a population of nanoparticles present at less than about 1 wt % (or even less than about 0.9, 0.8, 0.7, 0.6, 0.5, 0.4, 0.3, 0.2, or 0.1 wt %) measured against the weight of thermoplastic and nanoparticles in the workpiece. The population of nanoparticles suitably has a volume average cross-sectional dimension of less than about 100 nm. In some embodiments, at least some of the nanoparticles are silylated, suitably at their surface.

The population of nanoparticles may be present at (or less than) about 1, about 0.95, about 0.90, about 0.85, about 0.80, about 0.75, about 0.70, about 0.65, about 0.60, about 0.55, about 0.50, about 0.45, about 0.40, about 0.35, about 0.30, about 0.35, about 0.30, about 0.25, about 0.20, about 0.15, about 0.10, or even at about 0.05 wt % (measured against the weight of the thermoplastic and nanoparticles in the workpiece). The nanoparticle level may also be within the foregoing range as measured against the weights of the thermoplastic and the nanoparticles. It should be understood that all intermediate values in the foregoing range are included, e.g., 0.27 wt % and 0.12 wt %.

A workpiece may comprise one, two, or more polymers (e.g., polyetherimide). A workpiece may also include fillers and other additives, e.g., carbon nanotubes, graphene, carbon fiber, glass fiber, metallic fiber, metallic particles, and the like.

The population of nanoparticles may have a volume average cross-sectional dimension of less than about 100 nm, less than about 95 nm, less than about 90 nm, less than about 85 nm, less than about 80 nm, less than about 75 nm, less than about 70 nm, less than about 65 nm, less than about 60 nm, less than about 55 nm, less than about 50 nm, less than about 45 nm, less than about 40 nm, less than about 35 nm, less than about 30 nm, less than about 25 nm, less than about 20 nm, less than about 15 nm, less than about 10 nm. Nanoparticles having an average cross-sectional dimension in the range of from about 1 to about 25 nm are considered especially suitable, e.g., from about 2 to about 24, from about 3 to about 23, from about 4 to about 22, from about 5 to about 21, from about 6 to about 20, from about 7 to about 19, from about 8 to about 18, from about 9 to about 17, from about 10 to about 16, from about 11 to about 15, from about 12 to about 13, or even about 14 nm.

Aspect 2. The additive-manufactured workpiece of aspect 1, wherein the additive manufactured workpiece has a density of at least about 60% of the density of an injection molded workpiece formed of the corresponding thermoplastic powder. The workpiece may have a density of, at least about, e.g., 60%, 65%, 70%, 75%, 80%, 85%, 90%, 90%, 95%, or even 99% of an injection molded workpiece formed of the corresponding thermoplastic powder. For example, a workpiece according to the present disclosure may have a density of about 98% of the density of a workpiece made from the corresponding thermoplastic powder without the presence of nanoparticles.

Aspect 3. The additive-manufactured workpiece of any of aspects 1-2, wherein the nanoparticles are present at less than about 0.3 wt % (e.g., 0.3 wt %, 0.2 wt %, 0.1 wt %) measured against the weight of the thermoplastic powder and nanoparticles in the workpiece. The workpiece may also comprise nanoparticles present at less than about 0.3 wt % (e.g., 0.3 wt %, 0.2 wt %, 0.1 wt %) measured against the weight of the thermoplastic powder and nanoparticles in the workpiece.

Aspect 4. The additive-manufactured workpiece of any of aspects 1-3, wherein at least some of the nanoparticles comprise an aluminaoxide, a silicaoxide, hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate, or any combination thereof.

Aspect 5. The additive-manufactured workpiece of any of aspects 1-4, wherein at least some of the silylated nanoparticles comprise a monoalkyl silyl, a dialkyl silyl, a trialkyl silyl, or any combination thereof.

Aspect 6. The additive-manufactured workpiece of aspect 5, wherein at least some of the silylated nanoparticles comprise dimethylsilyl, trimethylsilyl, octylsilyl, or any combination thereof.

Aspect 7. The additive-manufactured workpiece of any of aspects 1-6, wherein the thermoplastic powder comprises one or more of PEI, PC, PLLA, PBT, PET, or any combination thereof.

PEI is considered especially suitable for the disclosure technology. Suitable polyetherimides are described in, e.g., United States published patent application no. 2014/0228462, the entirety of which is incorporated herein by reference.

Polyetherimides ("PEIs") are amorphous, transparent, high performance polymers having a glass transition temperature ("Tg") of greater than 180° C. PEIs further have high strength, heat resistance, and modulus, and broad chemical resistance. The high reliability and safety benefits afforded by a polyetherimide from its optical transparency, toughness, and heat resistance can be useful in medical applications.

Polyetherimides can comprise polyetherimides homopolymers (e.g., polyetherimidesulfones) and polyetherimides copolymers. The polyetherimide can be selected from (i) polyetherimidehomopolymers, e.g., polyetherimides, (ii) polyetherimide co-polymers, and (iii) combinations thereof. Polyetherimides are known polymers and are sold by SABIC Innovative Plastics under the ULTEM®*, EXTEM®*, and Siltem* brands (Trademark of SABIC Innovative Plastics IP B.V.).

Polyetherimides can be of formula (1):

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylenesulfone groups (a "polyetherimidesulfone"). Such linkers include but are not limited to: (a) substituted or unsubstituted, saturated, unsaturated or aromatic monocyclic and polycyclic groups having 5 to 50 carbon atoms, optionally substituted with ether groups, arylenesulfone groups, or a combination of ether groups and arylenesulfone groups; and (b) substituted or unsubstituted, linear or branched, saturated or unsaturated alkyl groups having 1 to 30 carbon atoms and optionally substituted with ether groups or a combination of ether groups, arylenesulfone groups, and arylenesulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

wherein Q1 includes but is not limited to a divalent moiety such as $-O-$, $-S-$, $-C(O)-$, $-SO_2-$, $-SO-$, $-C_yH_{2y}-$ (y being an integer from 1 to 5), and halogenated derivatives thereof, including perfluoroalkylene groups.

The linker V may include but are not limited to tetravalent aromatic groups of formula (3):

(3)

wherein W is a divalent moiety including —O—, —SO₂—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

(4)

wherein Q includes, but is not limited to a divalent moiety including —O—, —S—, —C(O)—, —SO₂—, —SO—, —C$_y$H$_{2y}$— (y being an integer from 1 to 5), and halogenated derivatives thereof, including perfluoroalkylene groups.

Polyetherimide may comprise more than 1, specifically 10 to 1,000, or more specifically, 10 to 500 structural units, of formula (5):

(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

Aspect 8. The additive-manufactured workpiece of any of aspects 1-7, wherein the thermoplastic powder comprises a crystalline polymer, a semi-crystalline polymer, or any combination thereof.

Aspect 9. The additive-manufactured workpiece of any of aspects 1-8, wherein the thermoplastic powder comprises an amorphous polymer.

Aspect 10. The additive-manufactured workpiece of any of aspects 1-9, wherein the nanoparticles are present at less than about 0.2 wt % measured against the weight of the thermoplastic powder and the nanoparticles in the workpiece.

Aspect 11. The additive-manufactured workpiece of any of claims 1-10, wherein the surface-modified nanoparticles have a volume average cross-sectional dimension of less than about 30 nm. The nanoparticles may have a volume average cross-sectional dimension of less than about 25 nm, less than about 20 nm, less than about 15 nm, less than 10 nm, or even less than about 5 nm.

Aspect 12. The additive manufactured workpiece of any of aspects 1-11, wherein the workpiece is characterized as being a medical implant, an aerospace component, an automotive component, a construction component, a transportation component, any component that is in a fire resistance application, or any combination thereof.

Aspect 13. A composition, comprising: a population of thermoplastic particles (e.g., polyetherimide); and a population of silylated nanoparticles having a volume average diameter of less than about 100 nm, the population of silylated nanoparticles being present at less than about 0.2 wt % measured against the weight of the thermoplastic and the nanoparticles in the composition.

Aspect 14. The composition of aspect 13, wherein the population of thermoplastic particles has a D50 volume average particle cross-sectional dimension in the range of from about 5 micrometers to about 150 micrometers, e.g., from about 10 micrometers to about 140 micrometers, or from about 20 micrometers to about 130 micrometers, or from about 30 micrometers to about 120 micrometers, or from about 40 micrometers to about 110 micrometers, or from about 50 micrometers to about 100 micrometers, or from about 60 micrometers to about 90 micrometers, or from about 70 micrometers to about 80 micrometers.

Aspect 15. The composition of any of aspects 13-14, wherein at least some of the silylated nanoparticles comprise a monoalkyl silyl, a dialkyl silyl, a trialkyl silyl, or any combination thereof.

Aspect 16. The composition of any of aspects 13-15, wherein at least some of the silylated nanoparticles comprise dimethylsilyl, trimethylsilyl, octylsilyl, or any combination thereof.

Aspect 17. The composition of any of aspects 13-16, wherein the composition exhibits a normalized viscosity of within 20% of the normalized viscosity of a composition of corresponding thermoplastic particles after 1000 s at 325 deg. C. and 1 radians/s.

Aspect 18. The composition of any of aspects 13-17, wherein the composition exhibits a normalized viscosity less than the normalized viscosity of a composition of corresponding thermoplastics particles after 1000 s at 325 deg. C. and 1 radians/s.

Without being bound to any particular theory, the surface modification of the nanoparticles is suitably selected so as to give rise to interfacial grafting between the nanoparticles and the thermoplastic powder. A variety of interfacial grafting may be exhibited.

Aspect 19. A method, comprising: depositing a first amount of a composition onto a target surface; the composition comprising a population of thermoplastic particles and a population of silylated nanoparticles having a volume average diameter of less than about 100 nm; directing energy to the first amount of the composition so as melt a portion of the first amount of the composition and join the first amount of the composition to the target surface.

As one example, the methods may be performed so as to deposit and solidify a first amount (e.g., a layer) of the composition on a substrate. The user may then deposit a second amount of the composition atop the first amount and then join the second amount to the first, this building up a layered structure. The second amount may comprise the same material as the material of the layer, but the second amount may also comprise a material that differs from the layer. The energy may, of course, act to fuse individual particles to one another.

The deposition may be effected by spraying, pipetting, gravity-feeding, casting, precipitation, rollers, electrostatic deposition, magnetic deposition, or by other techniques known to those of skill in the art. The energy may be directed to the second amount of the composition so as melt, sinter, or both a portion of the second amount of the composition and join the second amount of the composition to the layer.

Aspect 20. The method of aspect 19, wherein directing energy to the first amount of the composition effects formation of a layer comprising the composition. The energy is suitably applied to effect melting, sintering, or other particle-to-particle fusing or formation. The energy may be, e.g., laser energy, microwave energy, other radio energy, ultraviolet energy, infrared energy, or any combination thereof. Laser energy is considered especially suitable.

Aspect 21. The method of any of aspects 19-20, further comprising depositing a second amount of a composition onto the layer. The composition may be the same as the composition of the layer, but may also be another composition.

Aspect 22. The method of any of aspects 19-20, further comprising directing energy to the second amount of the composition so as melt a portion of the second amount of the composition and join the second amount of the composition to the layer.

Aspect 23. The method of any of aspects 19-22, wherein at least one of the depositing and directing energy is performed in an automated fashion. As one example, the automated fashion may entail directing energy in a pre-determined pattern so as to form layers or structures in defined locations. In this way, the user may construct a 3-D article having the desired contours.

Aspect 24. A system, comprising: a source of directed energy; a supporting surface; a dispenser configured to dispense a composition according to any of aspects 13-18 onto the supporting surface; a supply of the powder, the powder comprising a population of thermoplastic particles and a population of silylated nanoparticles having a volume-average diameter of less than about 30 nm; a control system configured to effect controlled sintering by the source of directed energy of successively applied amounts of powder so as to form a pre-defined structure.

Aspect 25. The system of aspect 24, wherein at least one of the source of directed energy, the supporting surface, and the dispenser is capable of controllable motion. The controllable motion may be effect manually, by computer, or in some other automated fashion. The motion may be in a pre-set pattern, e.g., in accordance with a pre-set schedule of locations. Dispensing the composition onto a substrate, the movement of the substrate, application of energy, and any other additive manufacturing steps may also be performed in an automated fashion.

The application of directed energy (including the energy type, energy intensity, and direction of energy) may be governed by a set of instructions that enable the application of the energy to be applied in an automated fashion. Likewise, motion of the supporting surface and the motion of the dispenser may be performed in accordance with a set of instructions (e.g., a 3-D model). Dispensing of the composition (e.g., location of dispensing, amount dispensed, type of material dispensed) may also be performed in an automated fashion.

Aspect 26. A method of affecting the melt flow behavior of a composition, comprising: to a population of thermoplastic particles, adding a population of surface-modified nanoparticles such that the nanoparticles are present at less than about 1 wt % measured against the combined weights of the thermoplastic particles and the nanoparticles, the population of surface-modified nanoparticles having a volume average cross-sectional dimension of less than about 100 nm.

Suitable nanoparticles and suitable thermoplastic particles are described elsewhere herein. PEI thermoplastic particles and silyl-modified nanoparticles are considered especially suitable. The addition may be accomplished by a shear mixer, a cyclone mixer, or by other mixing modalities known in the art.

The methods may further include forming one or more of the thermoplastic particles or the nanoparticles. The methods may additionally include introducing the mixed thermoplastic particles and nanoparticles into a container, e.g., a shipping or storage container, or even a container from which the mixture is dispensed. A container may also be a container that is part of an additive manufacturing system.

It should be understood that the disclosed compositions may be formed before introduction into an additive manufacturing system. The compositions may also be formed in an on-demand fashion, in which a mixture of thermoplastic particles and nanoparticles (and any other components) is formed from a supply of each ingredient at the time of use. In this way, a user may form a desired blend of thermoplastic particles and nanoparticles when needed. This in turn allows a single system to accommodate the different needs associated with different products, as a user may select for use the blend of materials best suited for a particular manufacturing project.

Aspect 27. A composition, comprising: a population of polyetherimide particles; and a population of silylated nanoparticles having a volume-average diameter of less than about 100 nm, the population of silylated nanoparticles being present at less than about 0.2 wt % of the composition and the silylated nanoparticles, the silylated nanoparticles being selected such that the composition has a melt flow of within about 10% (as measured by plate-plate rheology]) of a composition of corresponding polyetherimide nanoparticles, and the composition has a powder flow greater by at least 10% (e.g., as measured by a funnel) as compared to a composition of corresponding polyetherimide.

Aspect 28. The present disclosure also provides methods of enhancing the melt and/or powder flow characteristics of a polymer powder compositions. The methods may include, e.g., contacting a population of polyetherimide particles with a population of silylated nanoparticles having a volume average diameter of less than about 100 nm so as to admix the two populations. The polyetherimide particles may be according to the polyetherimide particles described elsewhere in this disclosure. Likewise, the silylated nanoparticles may be according to the silylated nanoparticles described elsewhere in this disclosure.

Aspect 29. A method of affecting the melt flow behavior of a composition, comprising: to an amount of a thermoplastic powder composition, adding a population of surface-modified nanoparticles such that the nanoparticles are present at less than about 1 wt % of the combined weights of the composition and nanoparticles, the population of surface-modified nanoparticles having a volume average cross-sectional dimension of less than about 100 nm.

Aspect 30. The method of aspect 29, wherein the surface modification comprises silylation. Alkylsilyl modifications are considered especially suitable, including monoalkyl silyl, dialkyl silyl, trialkyl silyl, or any combination thereof. In some embodiments, at least some of the silylated nanoparticles comprise dimethylsilyl, trimethylsilyl, octylsilyl, or any combination thereof.

Aspect 31. The method of any of aspects 29-30, wherein the thermoplastic powder comprises PEI, PC, PLLA, PBT, PET, or any combination thereof.

Aspect 32. The method of any of aspects 29-30, wherein the thermoplastic powder comprises a crystalline polymer, a semi-crystalline polymer, or both.

Aspect 33. The method of any of aspects 29-30, wherein the thermoplastic powder comprises an amorphous polymer.

Additional Disclosure

Identified here are illustrative, non-limiting compositions suitable for thermoplastic SLS applications. The disclosed compositions provide both suitable powder flow and suitable melt flow behavior, thus resulting in an optimized SLS processing.

Nanoparticles that result in favorable powder flow and melt flow may suitably feature at least some of the following characteristics:

Nanoparticles may be less than 100 nm in cross-section (e.g., diameter, radius); nanoparticles that are smaller in cross-section than 25 nm are considered especially suitable Nanoparticles may include a surface treatment (e.g., silyl) for improved powder flow Without being bound to any particular theory, comparatively lower silane levels in the coating of the nanoparticles may give rise to improved melt flow characteristics:

No coating; favorable melt at levels ≤0.2% (but suboptimal powder flow)

Octylsilyl; favorable melt at levels ≤0.2%

Trimethylsilyl; reasonable melt at levels ≤0.1%

It should be understood that the foregoing ranges are illustrative only and do not limit the scope of the present disclosure or the attached claims.

Figure 4:
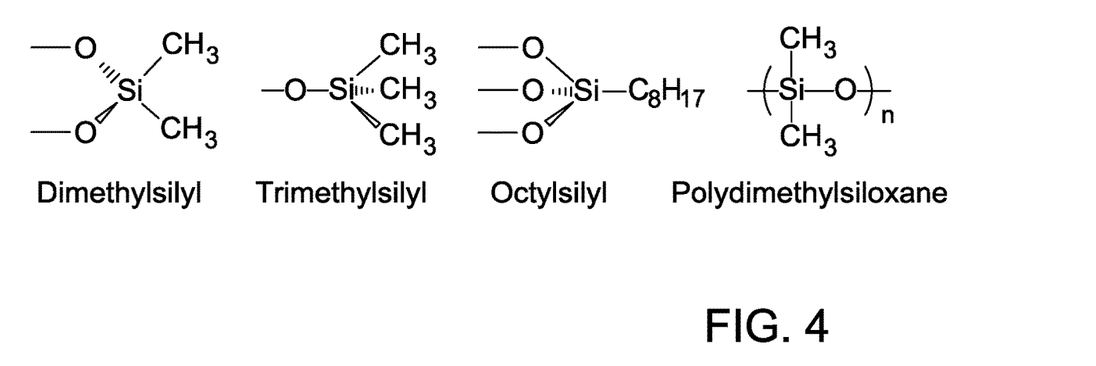
FIG. 4 presents the chemical structures of various coating types used in illustrative experiments disclosed herein.

Again without being bound to any particular theory, it was found that flow behavior was influenced by the coating type, including the level of silyl groups. Polydimethylsiloxane has the highest level of silyl and octylsilyl has the lowest level of silyl. This effect is also seen in the rheology data of FIG. 4.

Thermoplastic Particle Formation

Polymer powders can be prepared by techniques such as emulsification, precipitation (e.g., United States published patent application US2003/01816626, incorporated herein by reference in its entirety for any and all purposes), grinding, jet milling and spray drying.

If the powder includes particles that have too high or too low a particle size, then a sieving step may be introduced to assist in isolating particles of the desired size, e.g., from about 10 to about 150 micrometers in cross-sectional dimension.

Due to the availability of the emulsification process powder, PEI powder was chosen for the experimental tests. It should be understood that these tests are illustrative only, and the identified powder flow as well as melt flow characteristics apply for all powder-handling processes.

Powder Preparation

PEI powders and different levels and types of flow promoters were mixed in a high shear mixer in order to homogeneously distribute the flow promoters and break down the agglomerates of the flow-promoter. When mixed, the flow promoter covered a part of the surface of the polymer powder so as to reduce or even prevent direct interaction between thermoplastic powder particles. This results in a de-agglomerated powder.

SLS Testing

For SLS testing, a powder layer of the above-mentioned PEI powders was made via a roller system. The powder layer was then pre-heated close to near the glass transition temperature, and then a $CO_2$ laser added additional energy in order to melt-fuse the powder. For this testing—and unlike typical SLS part processing in which consecutive layers are added to form a part—only one powder layer was formed to assess the powder flow and powder-melt behavior. No absolute powder flow and melt flow data was obtained with the laser sintering tests, but relative data (e.g. favorable/good, reasonable or bad powder flow and powder melt) was obtained.

Rheological Testing

A TA Instruments Ares-G2™ rheometer was used to measure the effect of flow-promoter type on the viscosity of the PEI powder using the time sweep method. Time sweep experiments were carried out using a 25 mm parallel plate geometry and applying a shear rate of 0.1 rad/s (low shear, as there is no shear on the powder melt in the SLS process) at 325° C.

Materials

Figure 1:
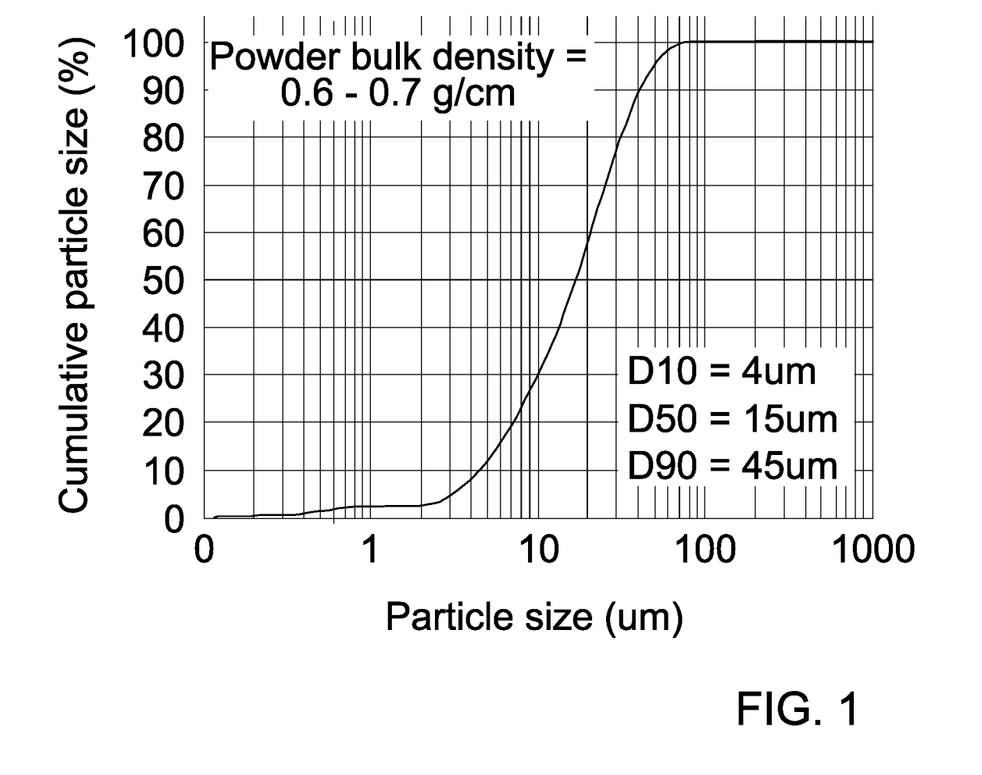
FIG. 1 exhibits particle size and bulk density of exemplary PEI powder used in illustrative experiments.
Figure 2:
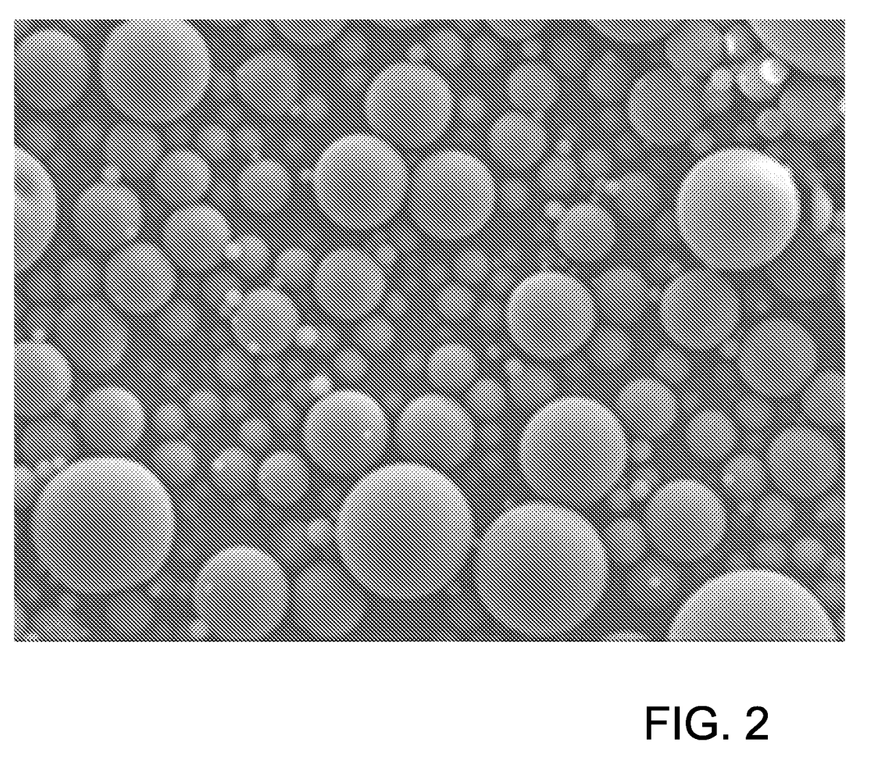
FIG. 2 presents an SEM picture of the used PEI powder.
Figure 3:
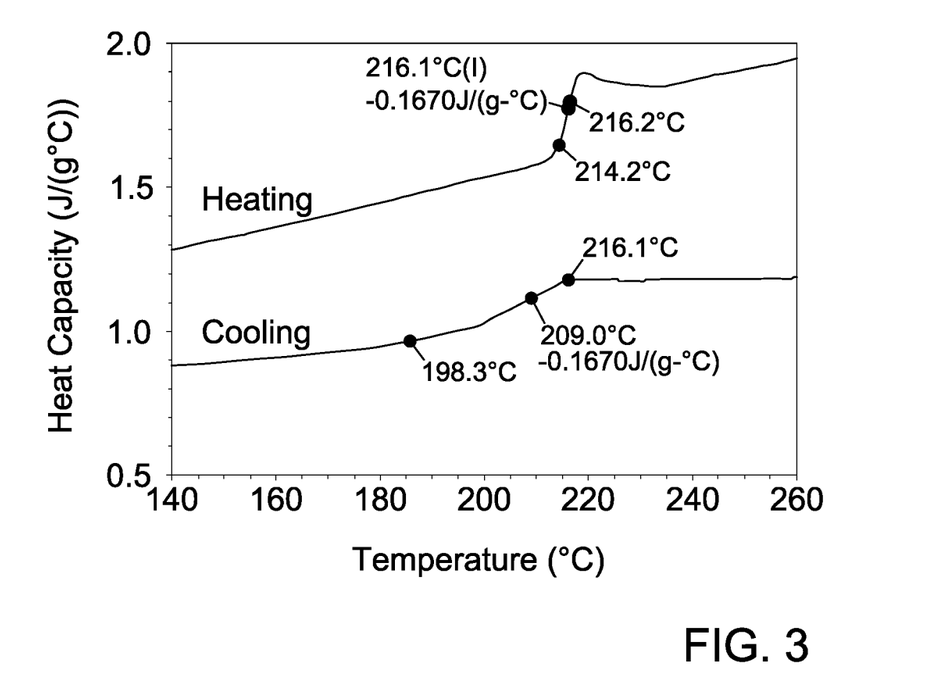
FIG. 3 presents a DSC plot of the used PEI powder.

For the experiments it was decided to use PEI powder made by an emulsion process. The PEI powder characteristics can be found in below FIGS. 1, 2 and 3 and the nanoparticle characteristics can be found in Table 1 and FIG. 4. A listing of nanoparticles is below:

| Grade name | Particle type | Coating type | BET surface |
|---|---|---|---|
| Aerosil 200 | silicaoxide | none | 200 |
| TS720 | silicaoxide | Polydimethylsiloxane | 115 |
| Aerosil R812 | silicaoxide | Trimethylsilyl | 260 |
| Aeroxide Alu C805 | aluminaoxide | Octylsilyl | 90 |

SLS Test Results

Although the powder flow via the SLS test method did not provide absolute data, insight in the powder flow was obtained via visual observations ranked from 1 (poor powder flow) to 5 (excellent powder flow).

Table 1 below shows that a flow-promoter needs to be added to the PEI powder as it is not possible to make a powder bed at all via the SLS test. Table 1 also shows that coated samples have superior powder flow in which there was only minor difference in the used coating system.

TABLE 1

Powder flow behavior in SLS test by coating type rated from 1 to 5
(1 = very poor, 3 = sufficient, 5 = excellent flow)

| Flow-promoter concentration | No coating | Polydimethyl-siloxane | Trimethyl-silyl | Octyl-silyl | Neat powder |
|---|---|---|---|---|---|
| 0.05% | 1 | NA | 3 | 3 | No flow at all |
| 0.1% | 1 | 5 | 4 | 4 | 0 |
| 0.2% | 2 | 5 | 5 | 5 | |

Table 2 below shows that although favorable powder flow may be obtained, melt flow characteristics are based on different phenomena. The table indicates that nanoparticles without coating show quite well melt flow. The polydimethylsiloxane (PDMS) coated particles result in very poor melt flow and particles coated with trimethylsilyl and octylsilyl had comparatively favorable melt flow; the octylsilyl coated particle has a slightly better melt flow at higher concentrations. This melt behavior suggests that some nanoparticle coatings with lower silane concentration have particularly favorable melt flow.

TABLE 2

Melt flow behavior in SLS test by coating type rated from 1 to 5
(1 = very poor, 3 = sufficient, 5 = excellent flow)

| Flow-promoter concentration | No coating | Polydimethyl-siloxane | Trimethyl-silyl | Octylsilyl | Neat powder |
|---|---|---|---|---|---|
| 0.05% | 4 | NA | 4 | 4 | 5 |
| 0.1% | 4 | 1 | 3 | 3 | |
| 0.2% | 3 | 1 | 2 | 3 | |

A powder flow score in the range of from 3 to 5 is preferable, in some embodiments. A melt flow score in the range of from 3 to 5 is also preferable in some embodiments.

Rheology Test Results

Figure 5:
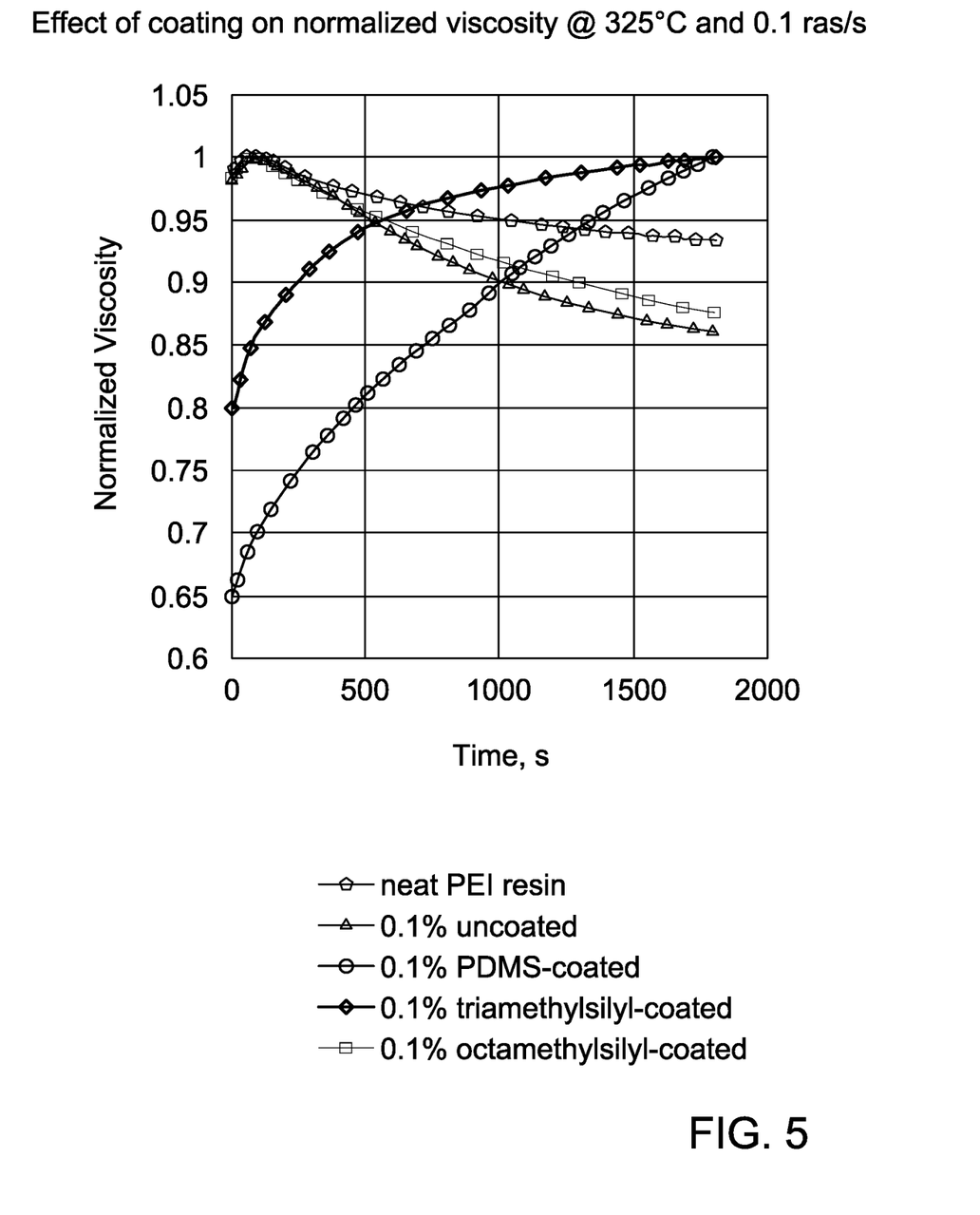
FIG. 5 provides normalized viscosity vs. time data for various PEI samples, including neat, 0.1% uncoated, 0.1% PDMS-coated, 0.1% trimethylsilyl-coated, and 0.1% octamethyl-coated samples.

The melt flow of PEI systems using different flow promoters was compared using a rheology measurement approach in which the viscosity stability is evaluated (FIG. 5). Pure PEI polymer melt without flow promoter was given for a direct comparison.

It was seen that a viscosity drop with time is observed for the neat PEI melt (0% nanoparticles), for melt with uncoated nanoparticles, and for coatings with longer chains (octylsilyl coating). The nanoparticles with trimethylsilyl coated particles showed an increase in viscosity over time, and particles coated with PDMS show a comparatively large increase in viscosity over time.

Further Testing

Additional testing of exemplary compositions was performed as follows.

SLS Powder Formation: Testing

As above, TA Instruments Ares-G2™ rheometer was used to measure the effect of flow-promoter type on the viscosity of the PEI powder using the time sweep method. Time sweep experiments were carried out using a 25 mm parallel plate geometry and applying a shear rate of 0.1 rad/s (low shear, as there is no shear on the powder melt in the SLS process) at 325° C.

Figure 6:
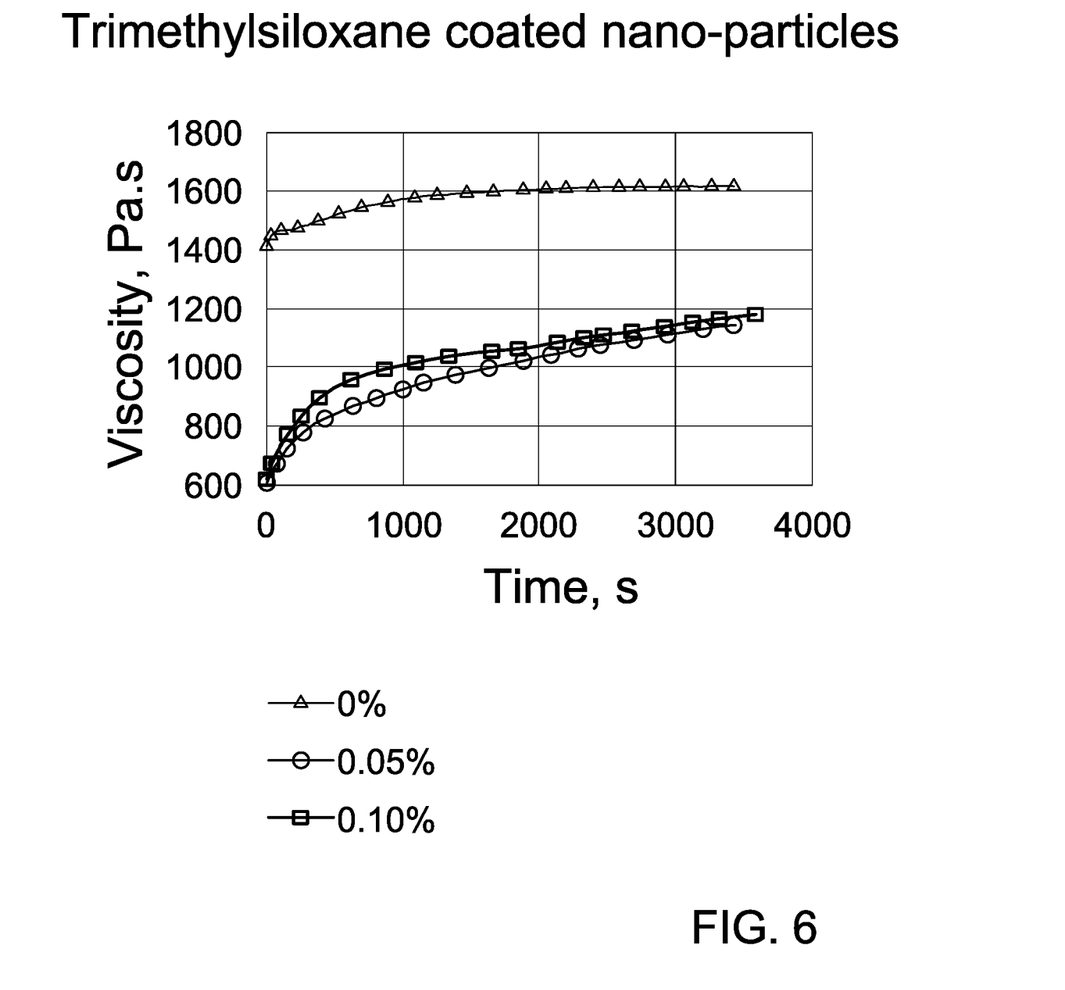
FIG. 6 provides viscosity vs. time of crystalline PEI in combination with a trimethylsilyl coated nano-siliciumoxide. The FIG. shows a drop at loadings up to 0.1 wt %.
Figure 7:
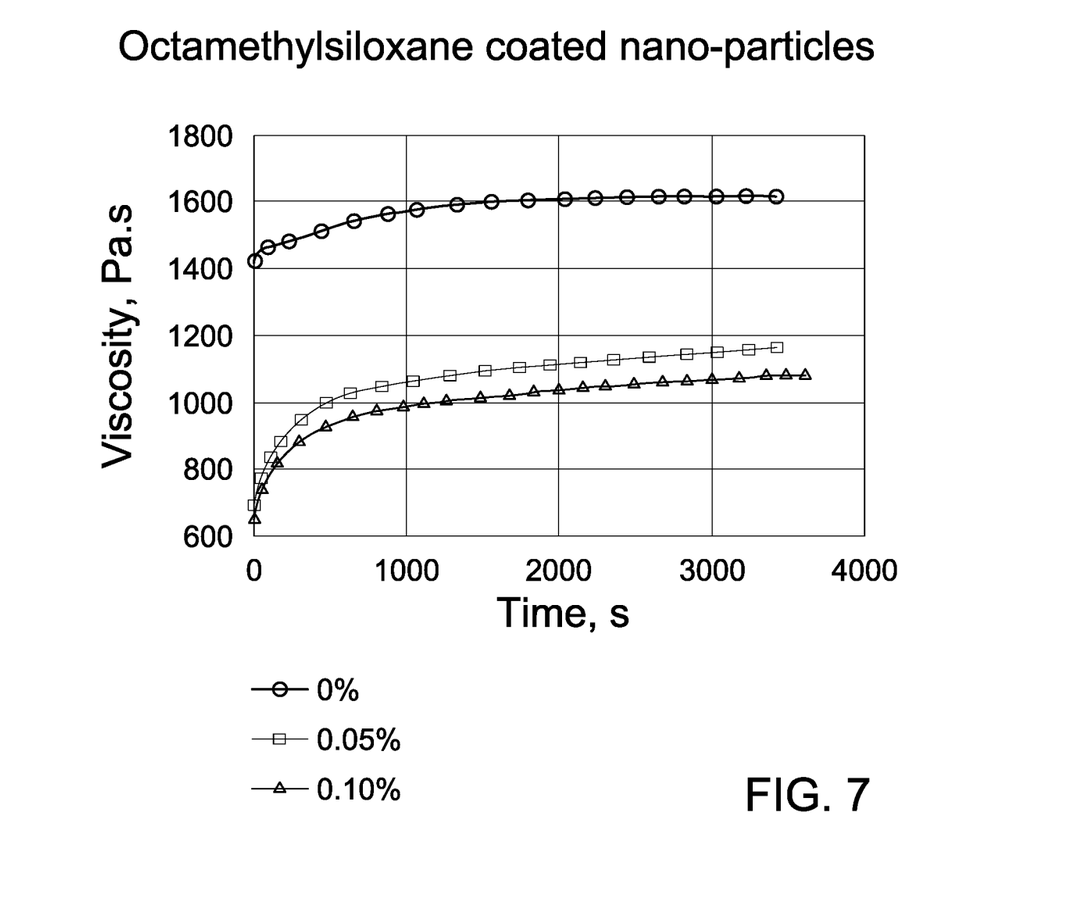
FIG. 7 provides viscosity vs. time of crystalline PEI in combination with octylsilyl coated nano-aluminaoxide. The FIG. shows a drop at loadings up to 0.1 wt %.
Figure 8:
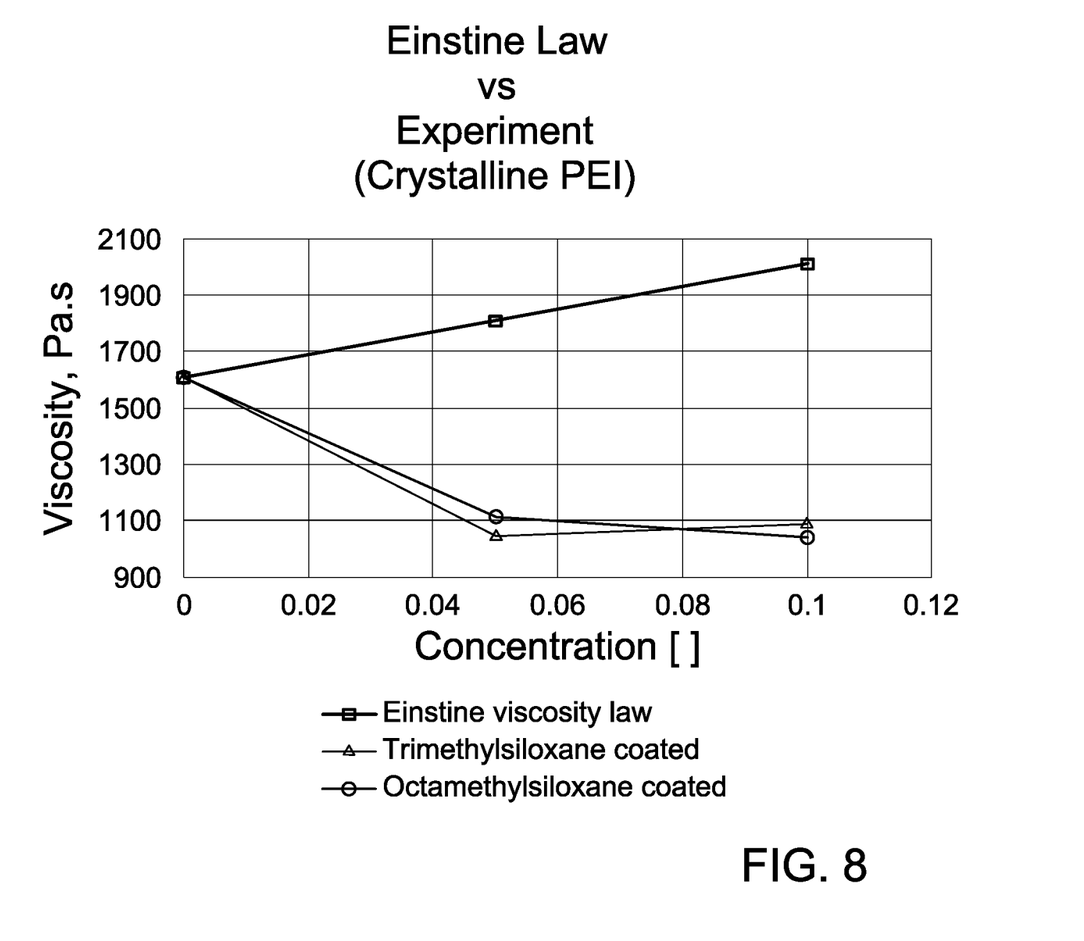
FIG. 8 provides expected viscosity based on filler concentration according to Einstein's law compared to actual viscosity using trimethylsilyl coated nano-siliciumoxide and Octylsilyl coated nano-aluminaoxide in a crystalline PEI polymer matrix.

The improved melt flow upon addition of flow promoters is shown with a viscosity drop as a function of nanoparticle concentration. Provided herein are two illustrative, non-limiting examples among the various possible coatings on nanoparticles that give an improved melt flow property (viscosity drop) for crystalline PEI powder, see FIG. 6 and FIG. 7. The viscosity scaling with concentration together with a comparison with Einstein's law is given in FIG. 8; the size of the particles in FIGS. 6-8 is a D50 of 62 micrometers.

Data support the hypothesis—without being bound to any particular theory of operation—that the decrease in viscosity of the melt, when adding flow promoters, is attributed to an interfacial grafting reaction between the nanoparticles and the polymer matrix. These grafted layers are immobilized on the surface and disentangled from the bulk resulting in a low viscosity layer around the particle resulting in viscosity drop at low concentrations. At higher concentrations, the reduced inter particle distance and the grafting lead to chain bridging and hence to viscosity increase.

Based on test data (including rheology), coated particle system result in improved powder flow compared to uncoated nanoparticles. Themoplastic powder without nanoparticle and with uncoated nanoparticles exhibited relatively inferior powder flow. The data also clearly show that the type of coating system has an effect on the melt flow. For most increased melt flow, coating systems with a lower amount of silane are especially favored, but are not required.

What is claimed:

1. An additive-manufactured workpiece, comprising:
   an amount of a fused thermoplastic powder comprising a thermoplastic composition comprising a thermoplastic selected from the group consisting of polyetherimide (PEI), polycarbonate (PC), poly(lactic acid) (PLLA), poly(butylene terephthalate) (PBT), and poly(ethylene terephthalate) (PET);
   a population of nanoparticles present at less than about 1 wt % measured against the weight of the thermoplastic and the nanoparticles in the workpiece, the population of nanoparticles having a volume average cross-sectional dimension of less than about 100 nm, and
   at least some of the nanoparticles being silylated;
   wherein the additive-manufactured workpiece has a density that is 70 to 99 percent of the density of a workpiece prepared by injection molding of the same thermoplastic composition.

2. The additive-manufactured workpiece of claim 1, wherein the nanoparticles are present at less than about 0.1 wt % measured against the weight of the thermoplastic powder in the workpiece.

3. The additive-manufactured workpiece of claim 1, wherein at least some of the nanoparticles comprise an aluminaoxide, a silicaoxide, hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate, or any combination thereof.

4. The additive-manufactured workpiece of claim 1, wherein at least some of the silylated nanoparticles comprise a monoalkyl silyl, a dialkyl silyl, a trialkyl silyl, or any combination thereof.

5. The additive-manufactured workpiece of claim 1, wherein the nanoparticles are present at less than about 0.2 wt % measured against the weight of the thermoplastic powder and the nanoparticles in the workpiece.

6. The additive-manufactured workpiece of claim 1, wherein the nanoparticles have a volume average cross-sectional dimension of less than about 30 nm.

7. A composition suitable for additive manufacturing, comprising:
   a population of thermoplastic particles comprising a thermoplastic selected from the group consisting of polyetherimide (PEI), polycarbonate (PC), poly(lactic acid) (PLLA), poly(butylene terephthalate) (PBT), and poly(ethylene terephthalate) (PET); and
   a population of silylated nanoparticles having a volume average diameter of less than about 100 nm,
   the population of silylated nanoparticles being present at less than about 0.2 wt % measured against the weight of the thermoplastic and the nanoparticles in the composition.

8. The composition of claim 7, wherein the population of thermoplastic particles has a D50 volume average particle cross-sectional dimension in the range of from about 5 micrometers to about 150 micrometers.

9. The composition of claim 7, wherein at least some of the silylated nanoparticles comprise a monoalkyl silyl, a dialkyl silyl, a trialkyl silyl, or any combination thereof.

10. The composition of claim 7, wherein at least some of the silylated nanoparticles comprise dimethylsilyl, trimethylsilyl, octylsilyl, or any combination thereof.

11. The composition of claim 7, wherein the composition exhibits a normalized viscosity of within 20% of the normalized viscosity of a composition of corresponding polyetherimide particles after 1000 s at 325 deg. C and 1 radians/s.

12. The composition of claim 7, wherein the composition exhibits a normalized viscosity less than the normalized viscosity of a composition of corresponding polyetherimide particles after 1000 s at 325 deg. C and 1 radians/s.

13. A method of additively manufacturing an article, comprising:
   depositing a first amount of a composition onto a target surface; the composition comprising a population of thermoplastic particles and a population of silylated nanoparticles having a volume average diameter of less than about 100 nm;
wherein the thermoplastic particles comprise a thermoplastic selected from the group consisting of polyetherimide (PEI), polycarbonate (PC), poly(lactic acid) (PLLA), poly(butylene terephthalate) (PBT), and poly(ethylene terephthalate) (PET);
   directing energy to the first amount of the composition so as to melt a portion of the first amount of the composition and join the first amount of the composition to the target surface; wherein directing energy to the first amount of the composition effects formation of a first layer comprising the composition;
   depositing a second amount of the composition onto the layer;
   directing energy to the second amount of the composition so as to melt a portion of the second amount of the composition and join the second amount of the composition to the layer; wherein directing energy to the second amount of the composition effects formation of a second layer comprising the composition; and
   depositing and at least partially melting additional amounts of the composition, thereby creating successive layers and forming a pre-defined structure.

* * * * *